UNITED STATES PATENT OFFICE.

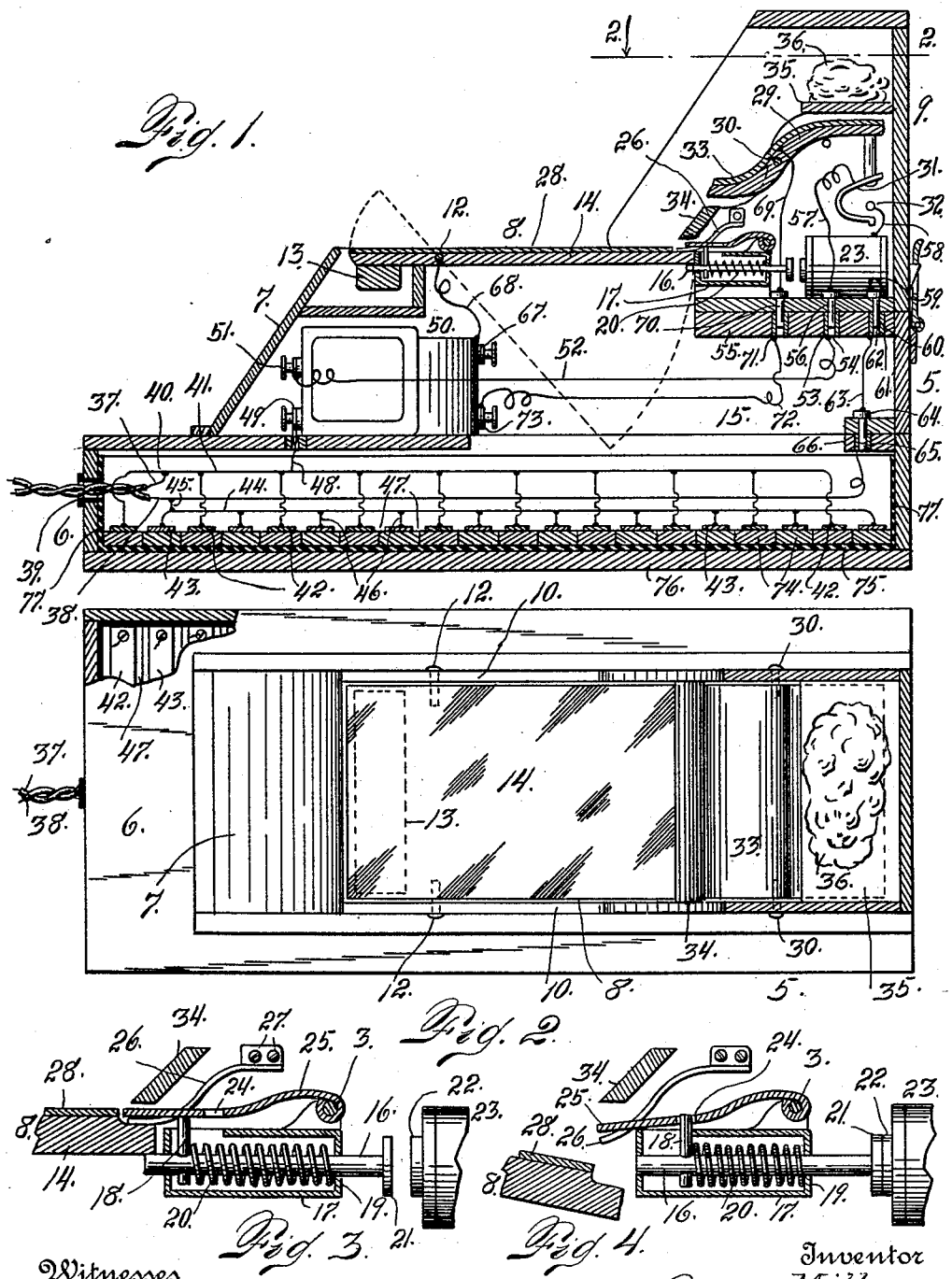

OSCAR MILLER, OF DENVER, COLORADO, ASSIGNOR OF FORTY-FIVE ONE-HUNDREDTHS TO ANNA W. MILLER, OF DENVER, COLORADO.

ELECTRIC ANIMAL-TRAP.

1,055,645.  Specification of Letters Patent.  Patented Mar. 11, 1913.

Application filed July 10, 1912. Serial No. 708,536.

*To all whom it may concern:*

Be it known that I, OSCAR MILLER, citizen of the United States, residing in the city and county of Denver and State of Colorado, have invented certain new and useful Improvements in Electric Animal-Traps; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in electrically operated animal traps, being more especially intended for use as a rat trap, but it must be understood that it may be employed for other animals, whether larger or smaller than rats.

In my improved construction the animal is induced by the use of bait to assume a position whereby it closes an electric circuit, which is completed through its body, whereby it is killed by electrocution. Provision is made whereby, as soon as the animal assumes the circuit-closing position, a member is rocked or moved on its pivot sufficiently to close an independent circuit through an electromagnet, the latter acting on a spring-actuated pin, to move the pin sufficiently to unlock a sort of trap door upon which the animal stands when the other circuit is closed through its body. Hence, as soon as this door is unlocked, the weight of the animal's body causes it to drop, whereby the animal is thrown into a chamber below, the said chamber being sufficiently large to hold any desired number of the animals caught.

The operation of the electric current upon the animal originally is only momentary, by reason of the comparatively quick operation of the trap door, but provision is made, after falling into the chamber below, whereby a circuit of less voltage is continued through the body of the animal until life is extinct. Were it not for this subsequent action of the current upon the animal, it might revive after falling into the chamber.

In order to obtain a current of sufficient voltage to perform the desired function, a transformer is employed whereby a current of low voltage is stepped up sufficiently for the purpose.

Having thus briefly outlined my improved construction, I will proceed to describe the same in detail, reference being made to the accompanying drawing, in which is illustrated an embodiment thereof.

In this drawing: Figure 1 is a central vertical section taken through my improved trap. Fig. 2 is a top plan view of the same, the upper portion, however, being sectionized on the line 2—2, Fig. 1. Fig. 3 is a fragmentary sectional view shown on a larger scale, illustrating the manner of locking and releasing the trap door. Fig. 4 is a similar view showing the parts in a different position.

The same reference characters indicate the same parts in all the views.

Let the numeral 5 designate a casing inclosing a portion of the mechanism of my improved construction. This casing comprises a base 6, a forwardly located inclined part 7 leading upwardly and rearwardly from the base, a trap door 8, and a top member 9.

The trap door is pivoted between the side walls 10 of the casing by means of pivot pins 12 passed through said walls and entering the opposite edges of the door forwardly of the center thereof. The front member of this door is provided with a weight 13 of sufficient mass to normally hold the door in the raised position. The weight, however, is so regulated with reference to the portion 14 of the door in the rear of the pivotal axis, that the weight of the body of the animal will cause the portion of the door in the rear of the pivot to descend, whereby the animal is thrown into the chamber 15 below. In order to lock the door against downward movement until the animal has received the shock due to the passage of the current through its body, a spring-actuated latch 16 is employed, the said latch being slidably mounted in a casing 17, and provided at its forward extremity with a stop-pin 18. This latch is surrounded by a spiral spring 20, one extremity of which bears against the rear end 19 of the casing, while the other extremity acts upon the stop-pin 18 to move the latch forwardly, whereby its forward extremity normally occupies a position under the rear end of the door 8. The rear extremity of the latch is provided with a head 21 arranged in suitable proximity to the core 22 of an electromagnet 23. When the magnet is energized, as hereinafter explained, the latch is moved rearwardly sufficiently to release the trap door, permitting the latter to assume, under the influence of the body of the animal, the dotted line position in Fig. 1. The rearward movement of the latch for the aforesaid purpose, brings its stop-pin 18 into register with a perforation 24 formed in a plate 25 pivoted at its rear extremity as shown at 3. As soon as the pin 18 is in register with the opening 24, the pivot plate falls sufficiently to cause the said pin to enter the opening 24, whereby the plate locks the latch at its rearward limit of movement, allowing the trap door to resume its normal position after the animal's body has been deposited in the chamber 15, the door returning to its upward position under the influence of the weight 13. The momentum of the upward movement of the door is sufficient to act upon the pivot plate 25 and raise the latter sufficiently to release the stop-pin 18, allowing the latch to assume its normal trap-door locking position, the electromagnet 23 in the meantime having been deënergized, as hereinafter more fully explained.

In order that the trap door may be perfectly solid and free from movement, which otherwise might frighten the animal when it first steps thereon, a leaf spring 26 is employed to act upon its rear extremity whereby the door, when in its normal position, is held tightly against the locking extremity of the latch. This spring also has a tendency to facilitate the downward movement of the rear part of the door when the latch has been withdrawn. Furthermore, the momentum of the door, due to the influence of the weight 13, will cause the door to act upon the spring 26 with sufficient force to raise the latter slightly and allow the latch to move to its locking position. The spring 26 is connected at its rear extremity, as shown at 27, with a stationary part of the structure.

The trap door is provided with a metal plate 28 which is applied to its upper surface. Above the rear extremity of the trap door is a trigger 29 pivoted as shown at 30, the pivot being so located that the rear part of the trigger will normally assume a relatively low position whereby the contact 31 carried by the trigger is disconnected from a contact 32, the latter being connected with one terminal of the electromagnet 23 whereby the circuit is normally broken through the magnet. The portion 9 of the trap has a stop 80 extending inwardly against which the longer and heavier part of the trigger 29 normally rests. The upper surface of the trigger 29 is provided with a metal covering 33. The space between the metal covering at the forward extremity of the trigger and the metal plate 28 at the rear end of the trap door is partially bridged by a member 34, enabling the animal, as a rat, while its hind feet remain on the trap door, to place its front feet upon the metal part of the trigger. As it does this it closes the circuit through its body, as hereinafter explained in detail. The weight of the animal's body upon the trigger as soon as its front feet reach the forward extremity thereof is sufficient to rock the trigger and bring the contact 31 into engagement with the contact 32, thus closing the circuit through the electromagnet which, being energized, acts on the latch 16 to release the trap door.

Just above the trigger 29 is a shelf 35 upon which a quantity of bait 36 is placed.

The electricity for use in connection with the machine may be taken from any suitable source, as the electric light circuit which is available in every house lighted by electricity. Two wires 37 and 38 may be connected with a plug, not shown, adapted to be inserted in the socket of the lighting circuit. These two wires are brought into the chamber 15 through an opening 39 at the forward end of the base of the casing. The wire 37 is connected, as shown at 40, with a relatively long wire 41 which is connected with a number of metal contacts 42, while the wire 38 is connected with a number of similar contacts 43 by means of a wire 44, a branch wire 45, and other branch wires 46. These metal parts 42 and 43 are alternately arranged in the bottom of the chamber 15 and spaced as shown at 47 whereby the circuit, through the said contacts, is normally broken. The spaces 47, however, are comparatively short, so that when a rat, for instance, falls into the chamber 15, its body will bridge one of these spaces whereby the current, with its normal voltage, will pass through its body.

The wire 37 is connected through the instrumentality of the wire 41 and a branch wire 48 with one terminal 49 of the primary coil of a transformer 50. From the opposite terminal 51 of the primary coil of the transformer, a wire 52 leads to a metal contact 53 which forms a lining for a perforation 54 in a shelf 55 supporting the electromagnet 23. This contact sleeve 53 is adapted to receive a contact pin 56 which is removably connected with the sleeve. From this pin 56 a conductor 57 leads to the contact 31 carried by the trigger 29, as heretofore explained. From the contact 32 a conductor 58 leads to one terminal of the electromagnet 23, while from the other terminal of said magnet, a wire 59 leads to a metal contact pin 60 removably connected with a contact sleeve 61, which forms the lining of a perforation 62 in the shelf 55. From the contact sleeve 61 a wire 63 leads to a contact pin 64 connected with a contact sleeve 65 mounted in a short shelf 66, with which the casing of the structure is provided. The contact sleeve 65 is connected with the main wire 38 of the circuit. In this manner it will be understood that the circuit, under its normal electro-motive force, say 110 volts, is closed through the electromagnet 23, as soon as the contact 31 is brought into engagement with the contact 32.

From one terminal 67 of the secondary coil of the transformer 50, a wire 68 leads to the metal plate 28, forming the covering of the trap door 8. From the metal covering 33 of the trigger 29 a conductor 69 leads to a metal contact pin 70 connected with a contact sleeve 71, from which a wire 72 leads to the other terminal 73 of the secondary coil of the transformer.

By virtue of the electrical circuits as heretofore explained, the operation of the machine will be readily understood. The animal, as a rat, in search of the bait 36, will first mount the base of the trap and continue its way up the inclined member 7 to the trap door 8 and then travel rearwardly thereon. When it reaches the rear extremity of the trap door its front feet will be placed upon the forward extremity of the metal covering 33 of the trigger, thus closing the circuit through the secondary coil of the transformer, the electro-motive force having been raised through the instrumentality of the transformer from the normal voltage of, say 110, to a voltage sufficient to accomplish the purpose, as say 1100. As soon as the rat is in the aforesaid position, the current with the stepped-up voltage will be passed through its body. With the placing of its front feet upon the trigger, the rear end of the latter will be raised sufficiently to bring the contact 31 into engagement with the contact 32, thus closing the circuit through the electromagnet 23, whereby the latter acts upon the latch 16 to move it rearwardly, releasing the trap door 14, in which event the weight of the rat's body on the said door forward of its pivot will cause the latter to move downwardly to the dotted line position in Fig. 1, precipitating the rat into the chamber 15, where its body will serve to bridge the space between two of the contact plates 42 and 43, where the low-voltage current will be continued through its body until life is extinct.

It is important that the voltage of the current through the plates 42 and 43 shall not be high, since otherwise the continued passage of the current through the bodies of the dead animals would result in burning their bodies, which is not desirable, since the animals will usually remain within the chamber of the trap from the time they are caught,—if it is in the night,—until morning, in any event for a considerable length of time.

It should be understood that the metal contacts 42 and 43 constitute metal strips extending entirely across the bottom of the chamber 15 of the trap. These metal contacts are normally insulated from each other, since they are connected with wood strips 74, the wood constituting a good insulator, being in a dry condition. Of course, any suitable insulating material may be employed. As illustrated in the drawing, a layer of insulating material 75 is interposed between the wood part 74 and the bottom proper 76 of the casing. An insulating lining 77 is also applied to the rear extremity of the base of the casing, and also to the forward end thereof.

Having thus described my invention, what I claim is:

1. In an electric animal trap, the combination of a receptacle, a trap door normally closing an opening in the top of the receptacle, a trigger, a circuit of high voltage in which the trap door and trigger are located, the door and trigger being spaced to break the circuit and so arranged that the body of the animal will bridge the space and close the circuit, a locking latch for the door, an electromagnet arranged, when energized, to act on the latch to release the door, a normally open circuit in which the magnet is located, the trigger being movable to close the magnet circuit simultaneously with the closing of the other circuit, a series of contact plates located in the bottom of the receptacle, a third circuit of low voltage with the branches of which the said plates are alternately and respectively connected, the spaces being such that the body of the animal will bridge the same and close the third circuit.

2. An animal trap comprising a normally open circuit of relatively high voltage, spaced contacts located in the said circuit and arranged to be bridged by the body of the animal whereby the latter is stunned, and a second circuit normally open and of lower voltage, said last named circuit having spaced contacts arranged to be bridged by the body of the animal after the latter has been acted on by the current of higher voltage.

3. The combination of a trap door, a trigger, the two elements being respectively equipped with spaced electrical contacts, a circuit of relatively high voltage in which the contacts are located, a latch normally locking the door in the raised position, an electromagnet, a second normally open circuit in which the magnet is located, the latch being arranged to be acted on by the electro-magnet to release the door when the magnet circuit is closed, the spaced contacts of the door and trigger being arranged to be bridged by the body of the animal to close the high-voltage circuit and means attached to the trigger for closing the magnet circuit upon the movement of the trigger by the body of the animal, the door being arranged when unlocked to fall under the weight of the animal to allow its body to slip therefrom, spaced contacts arranged below the trap door, a circuit of relatively low voltage in which the last named contacts are located, the said last-named contacts being arranged to be bridged by the body of the animal after it leaves the door.

4. An animal trap comprising means for subjecting the animal to a current of relatively high voltage, independent means for subjecting it to a current of lower voltage, and means for delivering the animal to the means for subjecting it to the current of lower voltage after it has been subjected to the current of higher voltage.

5. An animal trap comprising two distinct circuits of relatively high and low voltage, and means for subjecting the animal first to the current of the high voltage circuit and subsequently to the current of the low voltage circuit.

6. An animal trap comprising a circuit of relatively high voltage, a circuit of relatively low voltage, means for first subjecting the animal for a short period to the current of the high voltage circuit, and means for subsequently subjecting the animal to the current of the low voltage circuit for a longer period.

7. An animal trap comprising two distinct circuits of relatively high and low voltage, means for first subjecting the animal momentarily to the current of the high voltage circuit and subsequently subjecting it to the current of the low voltage circuit for an indefinite period.

8. An animal trap comprising electrical apparatus, a normally open circuit in which said apparatus is located, the latter including spaced contacts adapted to be bridged by the body of the animal, other electrical apparatus separated from the first apparatus, a circuit in which the second apparatus is located, spaced contacts located in the last named circuit and adapted to be bridged by the body of the animal, means for automatically delivering the body of the animal to the second apparatus after it has been acted on by the first apparatus, a current source of relatively high voltage for the circuit of the first-named apparatus, and a current source of relatively low voltage for the circuit of the second-named apparatus.

9. An animal trap comprising a receptacle, a trap door, an open electrical circuit, separated contacts arranged to be bridged by the body of the animal to close the said circuit, a trigger upon which one of said contacts is mounted, a second open circuit, the trigger being movable to close the last named circuit simultaneously with the closing of the first-named circuit, a magnet located in the second circuit, a latch normally in position to lock the door but acted on by the magnet to release the door which then opens in response to the weight of the animal, the said door being weighted to normally hold it in the closed position, and a spring engaging the latch.

10. An animal trap comprising a receptacle, a trap door therefor weighted to hold it in the closed position, a latch engaging the door from below to lock it in the closed position, a spring engaging the door from above to hold it tightly against the latch, a trigger spaced from the door, separated contacts carried by the door and trigger respectively but arranged to be bridged by the body of the animal, an electrocution circuit in which said contacts are located, a second circuit arranged to be closed by the movement of the trigger when the trigger contact is engaged by the body of the animal, a magnet located in the second circuit and arranged, when energized, to act on the latch to release the door, which has a tendency to open when the body of the animal is in position to close the electrocution circuit.

In testimony whereof I affix my signature in presence of two witnesses.

OSCAR MILLER.

Witnesses:
A. J. O'Brien,
May Clements.

Copies of this patent may be obtained for five cents each, by addressing the "Commissioner of Patents. Washington, D. C."